United States Patent [19]
Skala et al.

[11] Patent Number: 5,941,111
[45] Date of Patent: Aug. 24, 1999

[54] DIE SET WITH SUNKEN LOAD CELLS

[75] Inventors: Paul C. Skala, Stow; Timothy A. Frank, North Royalton; Fredrick F. Awig, II, Lyndhurst, all of Ohio

[73] Assignee: Pressco Technology, Inc., Cleveland, Ohio

[21] Appl. No.: 08/869,763

[22] Filed: Jun. 5, 1997

[51] Int. Cl.[6] .................................................. B21B 37/00
[52] U.S. Cl. ............................ 72/21.4; 72/477; 72/481.1
[58] Field of Search ........................ 364/474.07, 474.34, 364/474.37, 551.02; 29/621.1; 72/20.1, 20.2, 20.3, 20.4, 21.3, 21.4, 405.01, 405.06, 462, 476, 477, 481.1, 481.3

[56] References Cited

U.S. PATENT DOCUMENTS

| | | | |
|---|---|---|---|
| 4,987,528 | 1/1991 | O'Brien | 364/476 |
| 5,119,311 | 6/1992 | Gold et al. | 72/4 |
| 5,142,769 | 9/1992 | Gold et al. | 72/21.4 |
| 5,551,270 | 9/1996 | Bajraszewski et al. | 72/21.3 |
| 5,564,298 | 10/1996 | DeMeo | 72/20.1 |
| 5,622,069 | 4/1997 | Walters | 72/21.3 |
| 5,661,656 | 8/1997 | Goldman | 72/462 |

FOREIGN PATENT DOCUMENTS 60-76229   4/1985   Japan ..................................... 72/20.1

OTHER PUBLICATIONS

Smith, David A., *Die Design Handbook, Third Edition*, Society of Manufacturing Engineers (1990).

Wilhelm, Donald F., *Optimized Force Measurement*, Presented at: "Press Maintenance . . . Total Productive Maintenance for Presses" (Nov. 28–29, 1990).

*Primary Examiner*—Joseph J. Hail, III
*Assistant Examiner*—Ed Tolan
*Attorney, Agent, or Firm*—Calfee, Halter & Griswold, LLP

[57] ABSTRACT

An instrumentation system for measuring forces during tool and die forming operations including a load cell positioned in a well bored into a base plate. The plate includes a series of channels that carry wiring from the load cell to the periphery of the base plate. The load cell is preferably mounted flush with a supporting surface of the base plate to facilitate periodic cleaning. The load cell includes sensors generating a signal corresponding to the force or compression on the load cell. The load cell also includes apertures extending therethrough to allow existing tooling to be mounted on the load cell to the base plate via fasteners and pins extending through the load cell to the base plate. An universal load cell embodiment includes a pattern of apertures allowing two or more tools having unique hole patterns to be mounted on the load cell with fasteners and pins extending therethrough.

13 Claims, 4 Drawing Sheets

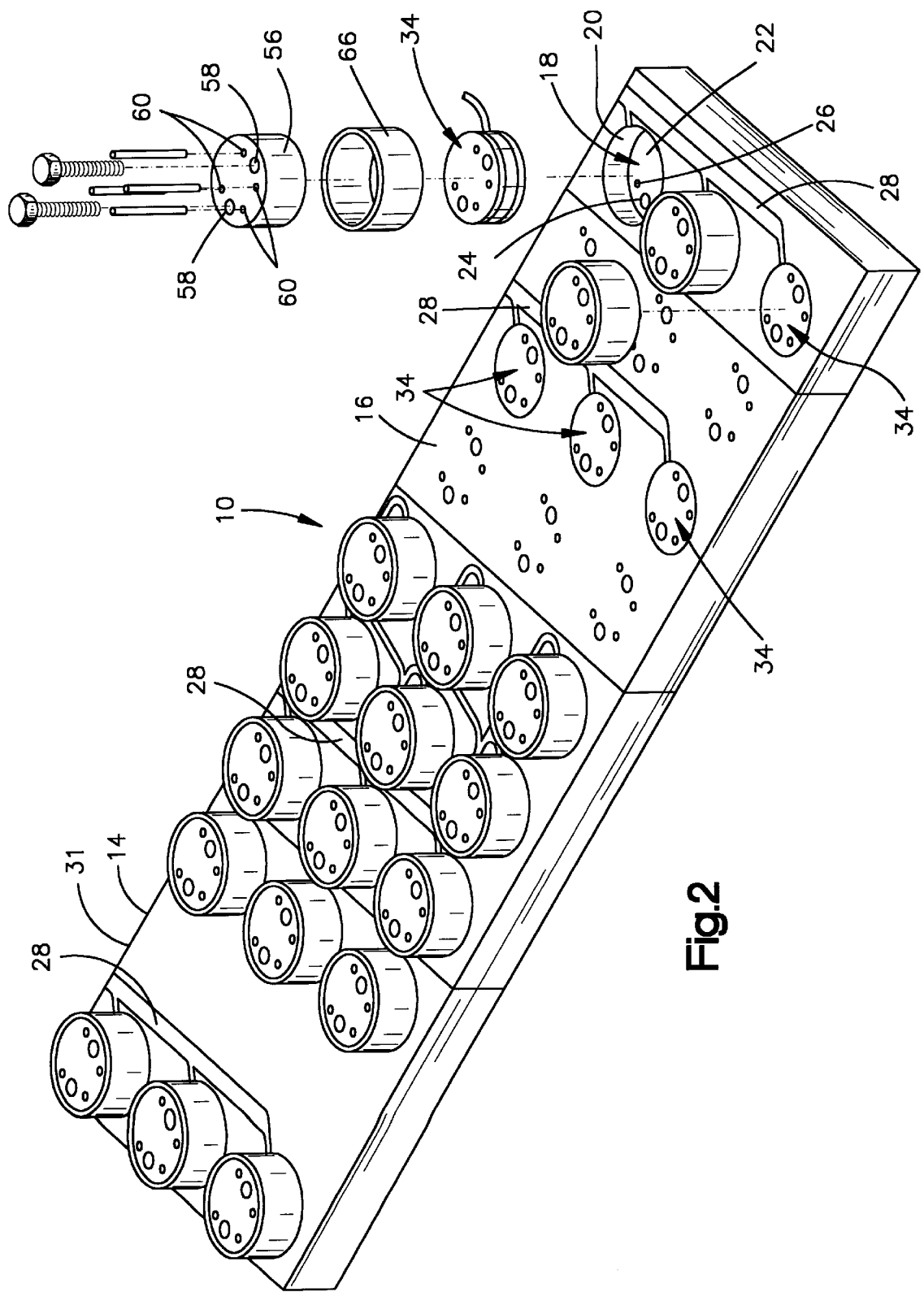

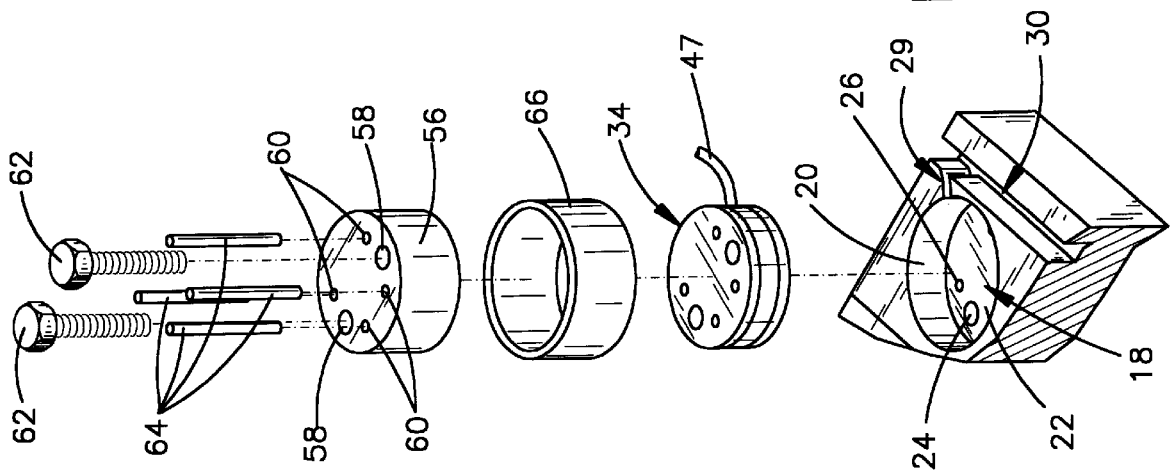
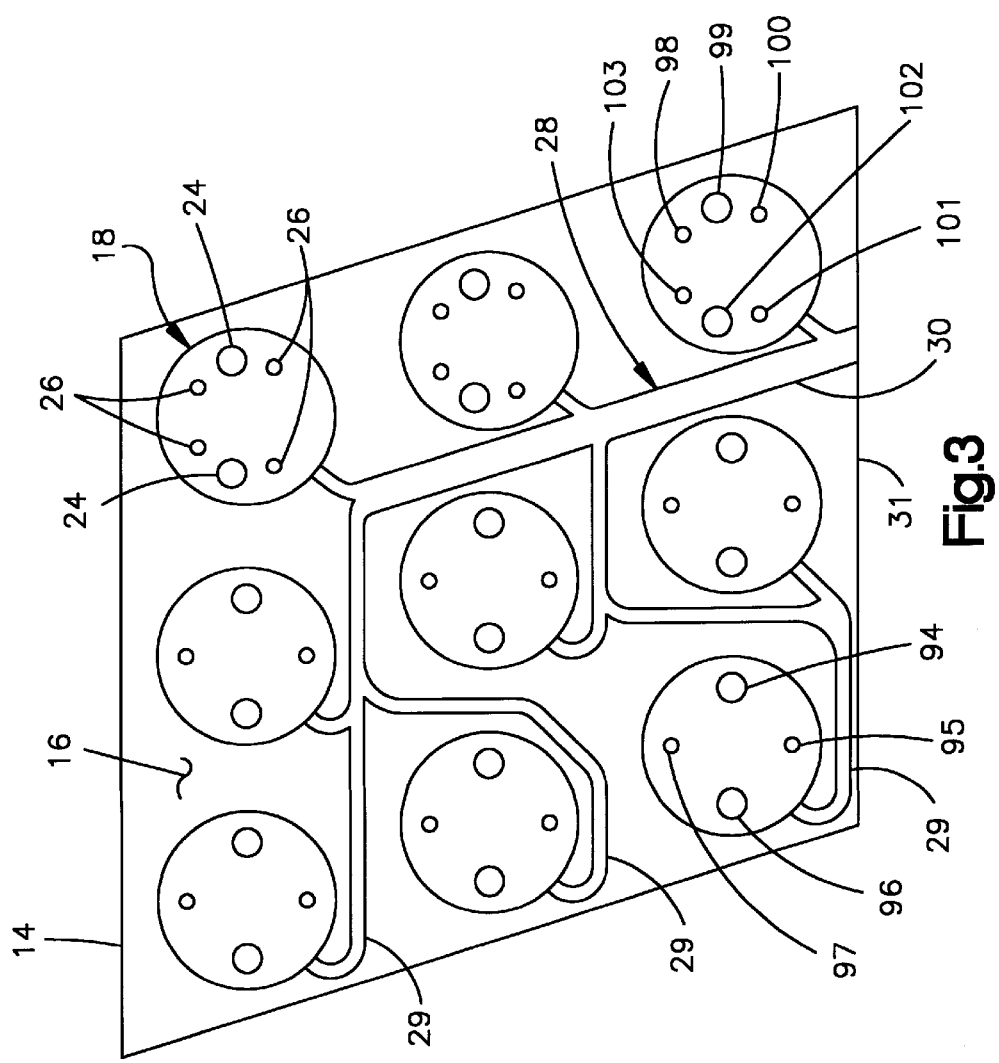

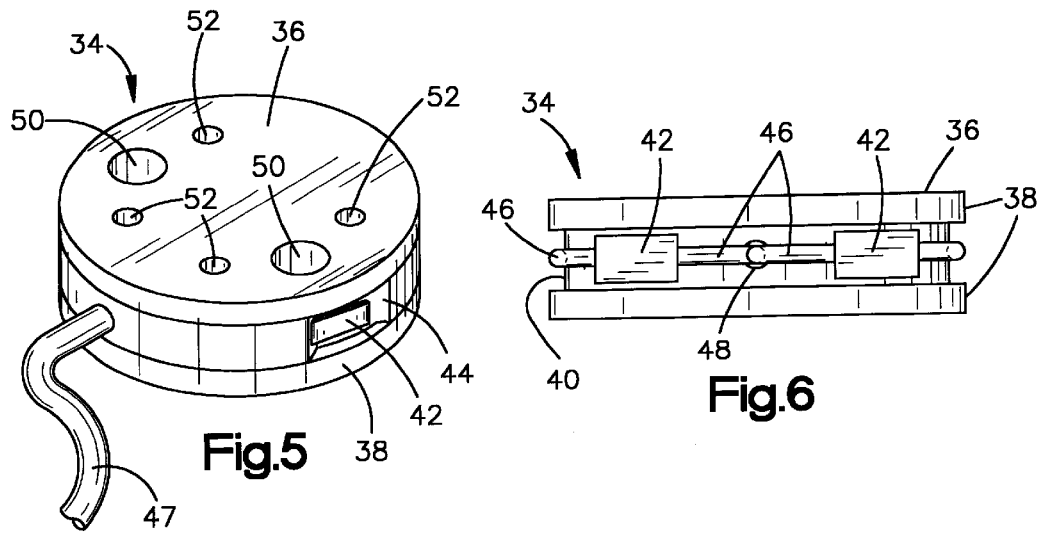
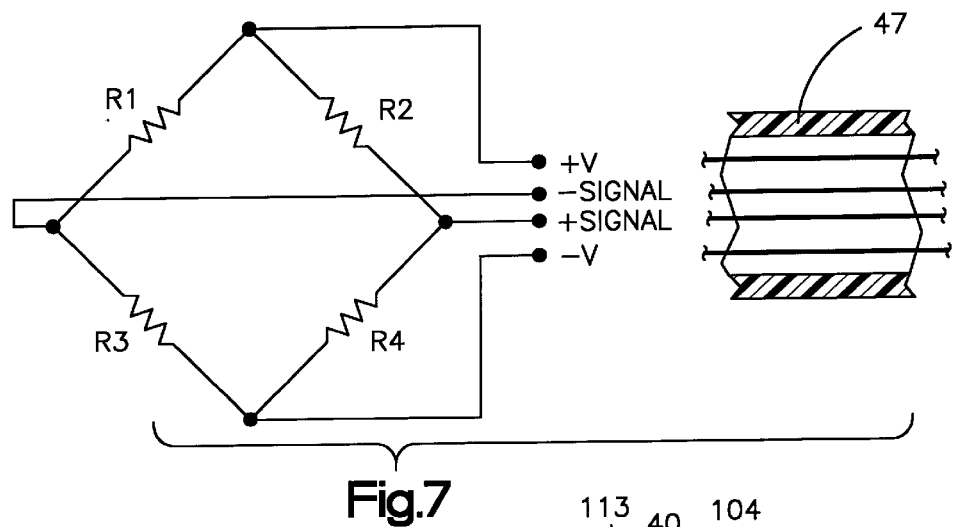
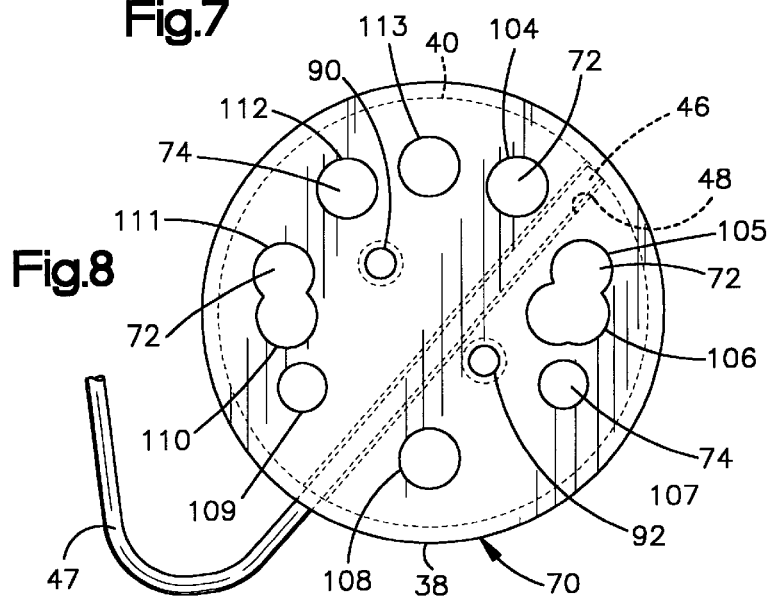

# DIE SET WITH SUNKEN LOAD CELLS

FIELD OF THE INVENTION

This invention relates generally to instrumentation of stamping or forming die sets, and more particularly to measurement of loads on tools of die sets during stamping or forming operations.

BACKGROUND OF THE INVENTION

In the formation of metal parts, one very common forming technique is a stamping operation utilizing die and tool sets. Frequently, the forming operation includes a series of dies or tools through which the part passes successively to move from a blank form to a final form, with each stamping operation excessively deforming or performing some other operation on the blank part until it reaches its final desired configuration.

During stamping operations, in many cases it is desirable to measure the load being applied to the tool of the die set during certain stamping operation. The load is monitored on various forms of monitoring equipment, such as oscillographs or recorders, or analyzed using various electronic systems to determine whether the process is being carried out within pre-selected limits or parameters and give an indication of any problems which are developing or have developed.

One common technique for measuring the force during stamping operations or blanking operations is by the use of various types of load cells. These load cells can take several different forms. One form utilizes piezo electric crystals which often are embedded in the tooling and are monitored to give an indication of the force by measuring electrical output as a function of the compression of the crystals.

This is a relatively inefficient technique and does not give high precision required for many operations.

Another technique which is utilized during blanking or forming operations, especially of can lids, is by the use of strain gauge load cells. In one particular prior art application, the load cell utilizes a spool member having strain gauges arranged around the periphery of this spool between the flanges at the opposite ends of the spool. The strain gauges are then potted with epoxy potting material. Wiring extends from the strain gauges to sense the movement or compression of the spool during forming operations. The load cell, is in turn connected between a tool and a tooling base.

The various prior art systems of interfacing the load cell to the tooling have drawbacks. In many, the wiring from the sensor is exposed. This exposure often results in premature failure of the sensor due to mishandling or rough treatment of the product during the course of normal maintenance. For example, die stations tend to accumulate metal fragments and other debris, which must be cleaned periodically. It is not uncommon for a screwdriver or putty knife to be hastily scraped between tooling to remove such debris, which scraping can sever wiring or cut into wiring insulation.

In other prior art systems, a specialized mounting piece is used, which requires a differently configured mounting piece for each tool. This adds cost to a system. In still other prior art systems, the tool itself contains the strain gauges and thus becomes the load cell; this adds cost, since the entire unit might need to be scrapped if either the tool or the sensor fails. Thus, there is a need for an improved system of interfacing load cells to tooling.

SUMMARY OF THE INVENTION

According to the present invention, an improved die assembly incorporating sunken load cells is provided. The die assembly includes a tooling base having a support surface thereon and an outer surface. At least one, and usually a plurality, of wells, preferably cylindrical in shape, are provided in the tooling base extending from said support surface to a bottom wall. A load cell insert, preferably in the shape of a spool, is provided for insertion in each well. The inserts each include one, and preferably several, strain gauges. The strain gauges of each insert are attached to wiring, which wiring is disposed in channels associated with each well when the insert is disposed in the well. The channels extend to the outer surface and preferably are open at the support surface of the tooling base. The wiring extends to the outer surface and is potted in its respective channel. Wider channels accommodating wiring from a number of load cells are also potted. When the load cell inserts are in the wells, a supporting surface on each load cell preferably is flush with the support surface on the tooling base. Appropriate tooling is mounted on the supporting surface of each load cell insert for the particular tooling stages, and during operation of the tool the strain at each tool location is measured and transmitted by the wiring which can be translated into force on each tool at various stages of operation. Also, the load cell has a number of holes extending therethrough to allow existing tooling to be mounted with fasteners and pins that extent through the load cell into the base plate. Since different tools can have fasteners and pins located in different arrangements, preferably the load cell is configured for universal use at a plurality of stages, with hole patterns that allow a number of different tools having differently arranged fasteners and pins to be mounted thereon. In the alternative, the load cell can have a single hole pattern thereby allowing only tooling unique to one stage or location to be mounted thereon.

It is therefor an advantage of the present invention to provide a load cell that mounts to tooling with the fasteners used to secure the tooling to a tool base.

It is also an advantage of the present invention to provide an instrumented die assembly with wiring that is protected from periodic cleanings of accumulated debris.

It is another advantage of the present invention to provide an instrumented die assembly having a load cell mounted flush with the supporting surface of the tooling base to facilitate cleaning.

It is yet another advantage of the present invention to provide an instrumented die assembly than can be easily retrofitted to instrument existing tooling.

It is still another advantage to provide a universal load cell that can have more than one tool having fasteners and pins positioned in different arrangements mounted thereon.

These and other advantages will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above and the detailed description given below, serve to example the principles of this invention.

FIG. 2 is the die set of FIG. 1 showing several parts exploded;

FIG. 3 is a plan view of a section of the tooling base of the die set of FIG. 1;

FIG. 4 is a detailed view of one of the stations of the die set with the load cell and tool exploded for clarity;

FIG. 5 is a perspective view of a load cell with parts broken away for clarity;

FIG. 6 is a side elevational view of a load cell with the potting compound removed to show the strain gauges;

FIG. 7 is a schematic wiring diagram of the strain gauges of the load cell; and

FIG. 8 is a plan view of another embodiment of a load cell.

DESCRIPTION OF THE PREFERRED EMBODIMENT

Figure 1:
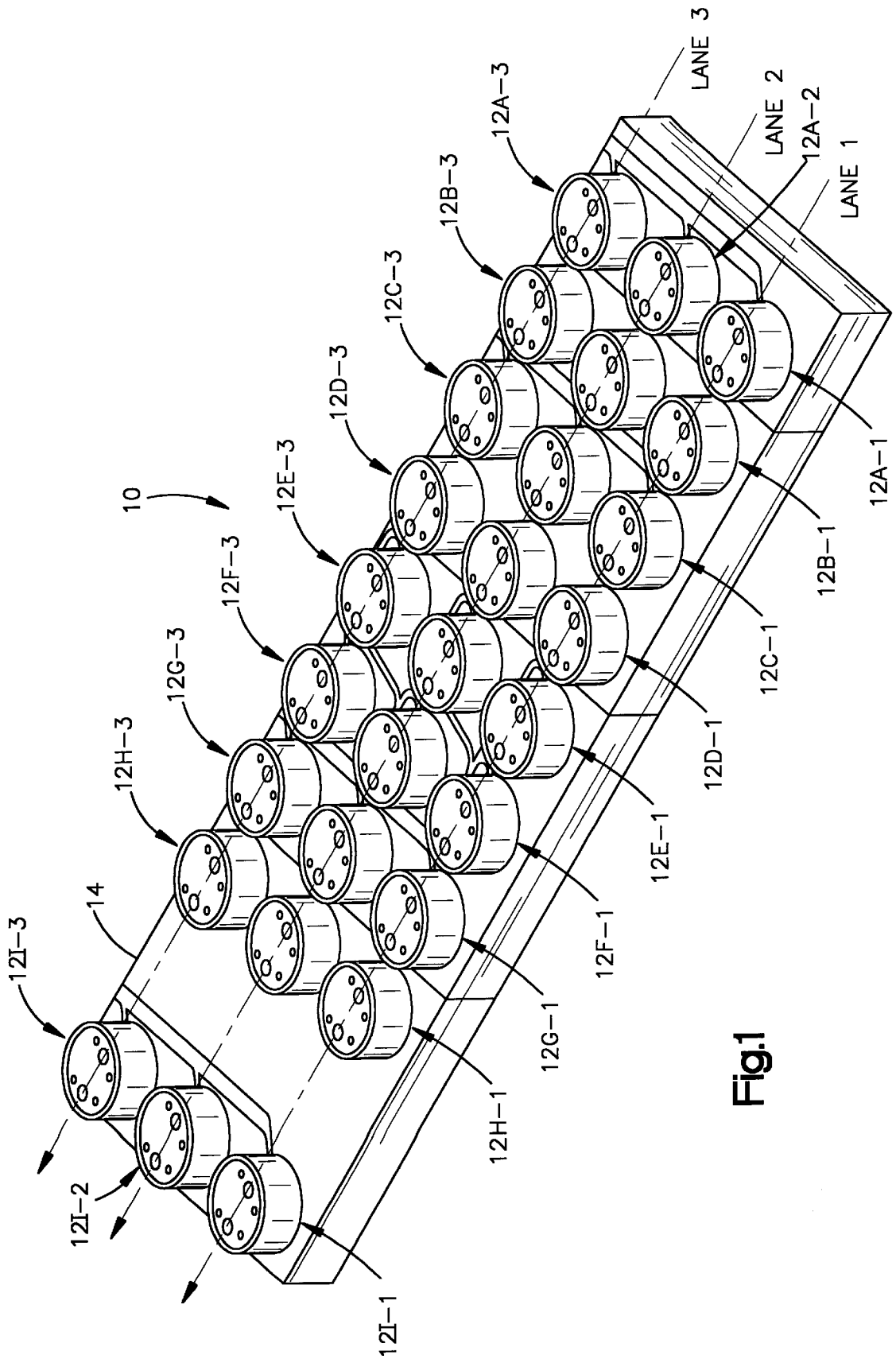
FIG. 1 is a perspective view of a three lane die set having a series of stations in each line for successively blanking and/or stamping parts.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now to the drawings, and for the present to FIGS. 1–4, a die set 10 for stamping or blanking can lids from preformed stock is shown. The particular die set illustrated is for three parallel blanking lines, each having a series of blanking or stamping stations through which preformed stock is passed successively, and at each stop an operation is formed thereon, such as initial forming, continuing forming, forming a tab area and mounting a tab. In this particular embodiment, each successive station of the three lanes is identical so that three identical end products emerge after passing through the succession of stations. It should be understood, however, that this particular arrangement of three lanes of several stations is merely illustrative, and that either one or two lanes could be used as well as more than three lanes. Also, the particular stations used are not material, the invention being applicable to any number of stations, including a single station and can be used for various stamping or blanking operations, not just for can lids.

The invention itself is directed to the structure and mounting of a load cell in a tooling base for the support of a tool member thereon, and thus the particular configuration of the die set, including the tooling configuration, at the various stations is immaterial. In the disclosed embodiment, there is a plurality of stamping or blanking stations 12, 12A, 12B, 12C, 12D, 12E, 12F, 12G, 12H and 12I, in each lane, these lanes being designated by the suffice -1, -2 and -3 where applicable. (The parts at the various stations 12, 12A, etc., will be described hereinafter without their suffixes unless necessary to differentiate between stations.)

The die set includes a tooling base 14 which preferably is formed in multiple sections, but which could be formed as a single plate member. For clarity of description, the tooling base 14 will be treated as if it were a single member.

The tooling base 14 has a support surface 16 with a plurality of wells 18 formed therein. There are some stations wherein force measurements are not required and thus no load cell is needed; therefore, no well need be, or is, provided at these stations.

Each of the wells 18 is preferably cylindrical in shape and defined by a side wall 20 and a bottom wall 22. Each of the bottom walls 22 have through threaded bores 24 and essentially smooth pin-receiving bores 26. The particular pattern of the threaded bores 24 and smooth bores 26 for each of the series of stamping stations 12A, 12B, 12C, etc., may vary, in a manner which will be indicated presently, to prevent the insertion of an improper tool at that station. A series of channels 28 are provided which communicate with each of the wells 18. The series of channels 28 open at the support surface 16 and extend to the outer periphery 31 of the tooling base 14. Preferably narrower channels 29 extend from each well, which narrower channels 29 connect with each other and with wider channels 30 to form a sunken, continuous path from each well 18 to the periphery 31 (FIG. 3).

As can best be seen in FIGS. 2 and 4, a plurality of load cells 34 are provided, one for each of the wells 18. The load cells 34 preferably have the same cross-sectional shape as the wells 18, in this case circular. Load cells of different shapes can be used, e.g., a square load cell. As shown in FIGS. 5, 6, and 8, the load cells 34 can be in the form of a spool 36 having flanges 38 at the opposite ends thereof separated by a depressed central portion 40. A series of strain gauges 42 are secured in the central portion 40 of the spool 36 between the flanges 38 and potted therein by potting compound 44 (not shown in FIG. 6). The strain gauges 42 are connected to wiring 46 which extends through a central aperture 48 (see FIG. 8) which extends transversely through the spool 36 and allows the escape of the wire from the spool. The wiring 46 extending from the load cell 34 is protected by a protective sheath 47, which is disposed in the series of channels 28, and thus disposed beneath the support surface 16. The wires 46 within the protective sheath 47 may be secured and protected in the series of channels 28 by a protective compound such as an epoxy potting compound (not shown) that completely or substantially fills the channels and that completely or substantially covers the wiring. The load cells 34 also have a plurality of openings 50 which correspond to the position of the threaded bores 24 and a plurality of openings 52 which correspond to the position of the smooth bores 26.

A blanking or forming tool 56A–56I is provided at each station 12A, 12B, etc., and where there is a load cell 34 at that station, the tool 56 rests on the load cell 34. As known to those skilled in the art, each tool 56A–56I is configured to perform a stamping, forming, or other operation on the piece being formed, and hence each has a different surface configuration depending upon the operation, although adjacent stations might have a similar or identical surface configuration to restrike the work piece. Each tool 56 has openings 58 corresponding to openings 50 in the load cell 34 and openings 60 corresponding to openings 52 in load cell 34. A plurality of threaded bolts 62 are provided which extend through the openings 58 in tool 56 and openings 50 in the load cells 34 and threadably engage the threaded bores 24 of base 14 to secure each tool and each load cell 34 in its respective well 18. Smooth pins 64 are inserted through openings 60 in tool 56 and openings 52 in the load cell 34 and through the smooth bores 26 in the tooling base 14. The pins 64 are a very tight fit, such as press fit in the openings 60 and 26 to allow precise positioning and alignment of the tools 56 and precise positioning and alignment of the load cells 34 at the particular stages. As indicated earlier, the pattern of the threaded bores 24 and smooth bores 26 for each station in the die set 10 are not all identical and only a load cell 34 and tool 56 having that particular configuration of openings can be secured thereon. The load cells are preferably made of A2 tool steel or, in the alternative, can be made of AISI 4130 steel. The upper and lower surfaces of the load cell 34 must be very flat and parallel to each other. Similarly, the bottom of the well 18 must be very flat and parallel to the upper surface 16 of the base plate 14. The clearance between the inside wall surface 20 of the well 18 the outside surface of the load cell 34 can be about 0.0004 inches or more. The depth of the well 18 and the overall height of the load cell 34 are matched so that the load cell does not protrude above the surface of the tool base more than about 0.0002 inches. The bottom surface 22 of the well 18 and the upper and lower surfaces of the load cell 34 must be flat to within ±0.0002 inches and cannot be larger than the diameter of the receiving pocket. The load cell 34 can be smaller than the pocket but not smaller than the tool mounted above it. This sensor 34 is designed to last the lifetime of the tool set as a minimum and is expected to last a minimum of five years.

Each load cell 34 has associated therewith a sensor, e.g., strain gages, used to generate an electrical signal corresponding to the amount of force applied to the load cell. Four, eight, or more sensors can be used with each load cell 34, as known to those skilled in the art. FIG. 7 is a schematic wiring diagram of the wiring configuration of a four strain gage load cell showing strain gages R1, R2, R3 and R4 operating in a Wheatstone bridge configuration. Voltages of +10 VDC and -10 VDC are applied to the +V and -V terminals, respectively, and the signal output (potential difference between +SIGNAL and -SIGNAL) corresponds to the load on the strain gauges 42. A total load sensitivity of 3 of signal per volt of excitation is acceptable. The strain gages are placed in circuit communication with an electronic device (not shown) used to display, record, and/or analyze the signal output and, optionally, determine the force applied to the load cell or determine another parameter related to the force applied to the load cell. Load cells having suitable sensors therein are available as Model No. SS1133 from Toledo Transducers of 6834 Spring Valley Drive, Holland, Ohio 43528.

As known to those skilled in the art, as shown in FIGS. 1, 2 and 4, an annular ring 66 is typically provided around each tool 56. This ring is optional depending on the preference of the manufacturer, and is used to protect the tools from damage.

Referring now to FIG. 8, another embodiment of a load cell 70 is shown. The load cell 70 of FIG. 8 is a universal load cell 70 in that it has a pattern of openings allowing use of the load cell 70 with a plurality of tools having different hole patterns. The load cell 70 is similar in configuration to the load cell 34 in that it is formed of a spool 36 having flanges 38, a central portion 40 with strain gauges potted thereon and an aperture 48 extending therethrough. However, in this embodiment, a series of openings 72 and 74 are provided which allow the strain gauge to be utilized in more than one of the wells 18 of the tooling base 14 having different patterns of holes, i.e., more than one configuration of holes 58 and 60 in tool 56 that match with corresponding bores 24 and holes 26 in a well 18 can be accommodated by a single load cell 70. Expressed another way, the openings 58 and 60 in the tool and bores 24 and holes 26 are specific to the specific tool and will be accommodated by the load cell 70. Thus, the load cell is specific to a particular tool when load cell 34 is used, whereas load cell 70 is a universal load cell which can be used at more than one station with the location of the threaded bores 24 and the smooth bores 26 determining which tool, 58A, 58B, 58C, etc., will fit thereon.

The specific universal load cell 70 shown in FIG. 8 is universal to all of the stations associated with the plate 14 shown in FIG. 3. As is apparent from that figure, wells having two different hole patterns are shown in the plate 14 of FIG. 3: (imagining each well as corresponding to the face of a clock and using the center of the bottom 22 of each well as a common reference point) six wells having holes at about 3 o'clock (94), 6 o'clock (95), 9 o'clock (96), 12 o'clock (97) and three wells having holes at about 1:30 (98), 2:30 (99), 4 o'clock (100), 8 o'clock (101), 9:30 (102), and 10:30 (103). The universal load cell of FIG. 8 can be used in wells having either hole pattern because the universal load cell 70 has holes at about 1:30 (104), 2:30 (105), 3 o'clock (106), 4 o'clock (107), 6 o'clock (108), 8 o'clock (109), 9 o'clock (110), 9:30 (111), 10:30 (112), and 12 o'clock (113). The load cell 70 of FIG. 8 also shows optional threaded openings 90, 92 used to retain temporary jacking screws (not shown) to facilitate removing the load cells 34, 70 from the wells 18.

With the present invention, the load cell 34 or 70 is separate from the tool 56 and tool base 12, and it can easily be inserted and removed from the base 12 for repair or replacement. Moreover, the wiring is protected in the channels. Additionally, with the embodiment of FIG. 8, a universal load cell is provided so that load cells specific to each station need not be stocked.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A mounting for a die set, comprising;
   a. a base plate having a support surface and an outer peripheral surface, and including at least a first well and a second well sunken into said support surface, each well having a bottom portion and a wall portion and being open at said support surface, and wherein said first well has a plurality of holes arrayed in a first pattern in the bottom portion thereof, and said second well has a second plurality of holes arrayed in a second pattern in the bottom portion thereof;
   b. a load cell mounted in each well, each load cell including a cell body and at least one sensor operatively associated with said cell body to generate a sensor signal corresponding to a load applied to said cell body, each load cell having a first pattern of apertures extending therethrough corresponding to said first pattern of holes in said first well and a second pattern of apertures extending therethrough corresponding to said second pattern of holes in said second well, so that a given load cell can be used in at least two different wells having different patterns of apertures to thereby accommodate tools with different hole patterns; and
   c. wiring connected to each sensor of each said load cell.

2. The mounting for a die set according to claim 1 wherein a first plurality of pins extend through at least two apertures of the first pattern of apertures and into corresponding holes of said first pattern of holes in said first well and wherein a second plurality of pins extend through at least two apertures of the second pattern of apertures and into corresponding holes of said second pattern of holes in said second well.

3. The mounting for a die set according to claim 2 wherein a first tool having a first tooling configuration is mounted on said load cell in said first well with said first plurality of pins extending into holes in said first tool, and wherein a second tool having a second tooling configuration is mounted on said load cell in said second well with said second plurality of pins extending into holes in said second tool.

4. The mounting for a die set according to claim 3 wherein a first plurality of bolts extend through holes in said first tool, through apertures of said first plurality of apertures, and into threaded holes in said bottom portion of said first well and wherein a second plurality of bolts extend through holes in said second tool, through apertures of said second plurality of apertures, and into threaded holes in said bottom portion of said second well.

5. The mounting for a die set according to claim 1 wherein each well in said base plate has an associated channel in said base plate extending from each well to said outer peripheral surface of said base plate and wherein said wiring associated with each said load cell resides in the channel corresponding to the well into which that load cell is mounted.

6. The mounting for a die set according to claim 5 wherein said channels are substantially filled with and said wiring is substantially covered with a protective compound.

7. The mounting for a die set according to claim 4 wherein each well in said base plate has an associated channel in said base plate extending from each well to said outer peripheral surface of said base plate and wherein said wiring associated with each said load cell resides in the channel corresponding to the well into which that load cell is mounted.

8. The mounting for a die set according to claim 7 wherein said channels are substantially filled with and said wiring is substantially covered with a protective compound.

9. The mounting for a die set according to claim 1 wherein said load cells are mounted flush with said support surface of said base plate.

10. The mounting for a die set according to claim 7 wherein upper portions of said load cells are mounted flush with said support surface of said base plate.

11. A mounting for a die set, comprising;

a. a base plate having a support surface and an outer peripheral surface, and including at least one well sunken into said support surface, each well having a bottom portion and a wall portion and being open at said support surface, and wherein said at least one well has a plurality of holes arrayed in a pattern in the bottom portion thereof;

b. a load cell mounted in said at least one well, said at least one load cell including a cell body and at least one sensor operatively associated with said cell body to generate a sensor signal corresponding to a load applied to said cell body, said at least one load cell having a pattern of apertures extending therethrough corresponding to said pattern of holes in said well;

c. wiring connected to each sensor of each said load cell;

d. a plurality of pins extending through at least two apertures of the pattern of apertures and into corresponding holes of said pattern of holes in said well;

e. a tool mounted on said load cell with said plurality of pins extending into holes in said tool; and f. a plurality of bolts extend through holes in said tool, through apertures of said plurality of apertures, and into threaded holes in said bottom portion of said well.

12. The mounting for a die set according to claim 11 wherein the upper portion of said load cell is mounted flush with said support surface of said base plate.

13. The mounting for a die set according to claim 11 wherein said well in said base plate has an associated channel in said base plate extending from said well to said outer peripheral surface of said base plate, wherein said wiring associated with said load cell resides in the channel corresponding to the well into which that load cell is mounted, and wherein said channels are substantially filled with and said wiring is substantially covered with a protective compound.

* * * * *